G. A. ERRINGTON.
CHECK WRITING MACHINE.
APPLICATION FILED NOV. 25, 1916. RENEWED MAY 15, 1919.

1,308,149.

Patented July 1, 1919.
9 SHEETS—SHEET 2.

INVENTOR
GEORGE. A. ERRINGTON.
ATTYS.

G. A. ERRINGTON.
CHECK WRITING MACHINE.
APPLICATION FILED NOV. 25, 1916. RENEWED MAY 15, 1919.

1,308,149.

Patented July 1, 1919
9 SHEETS—SHEET 3.

INVENTOR
GEORGE A. ERRINGTON
ATTYS

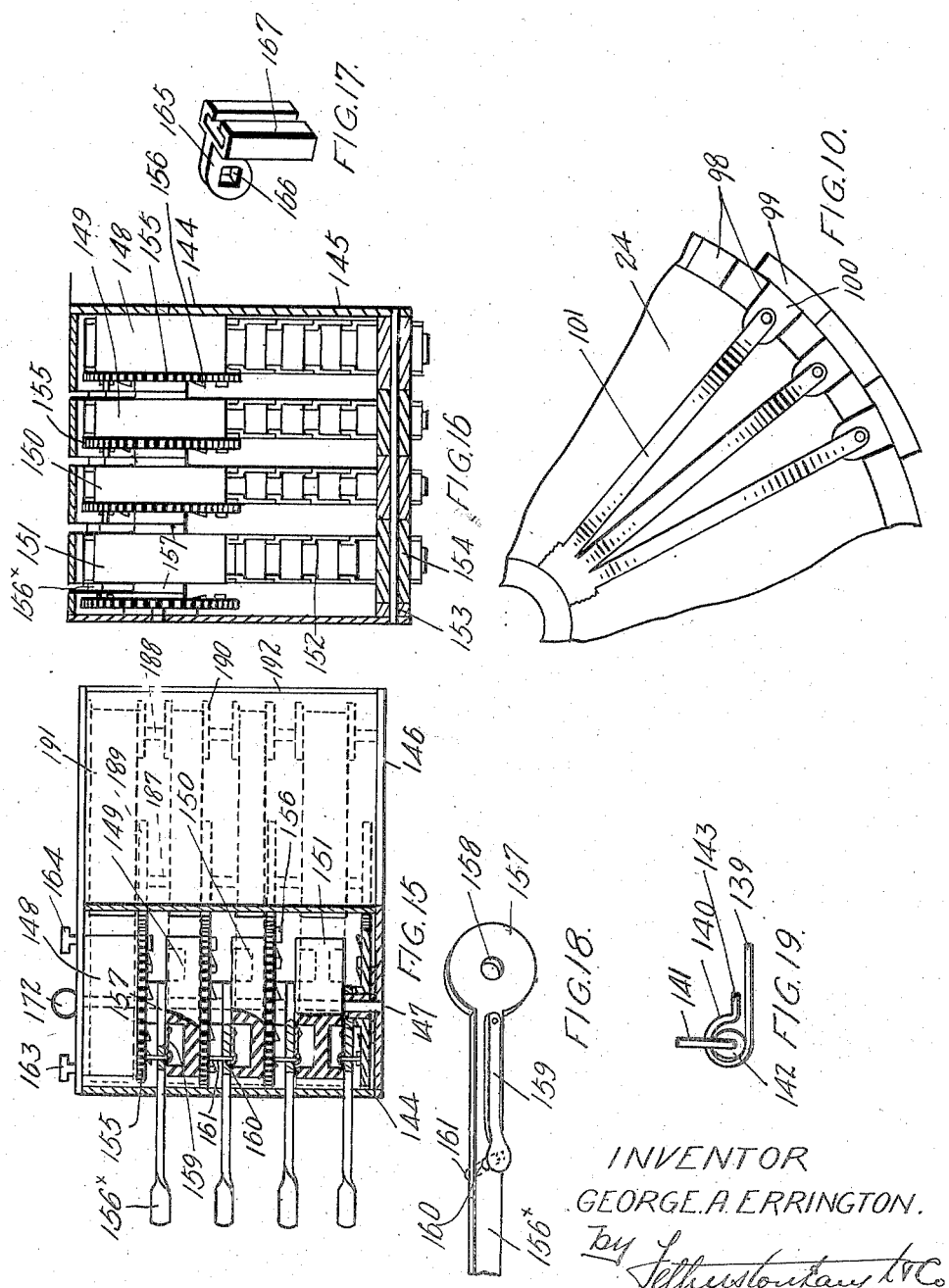

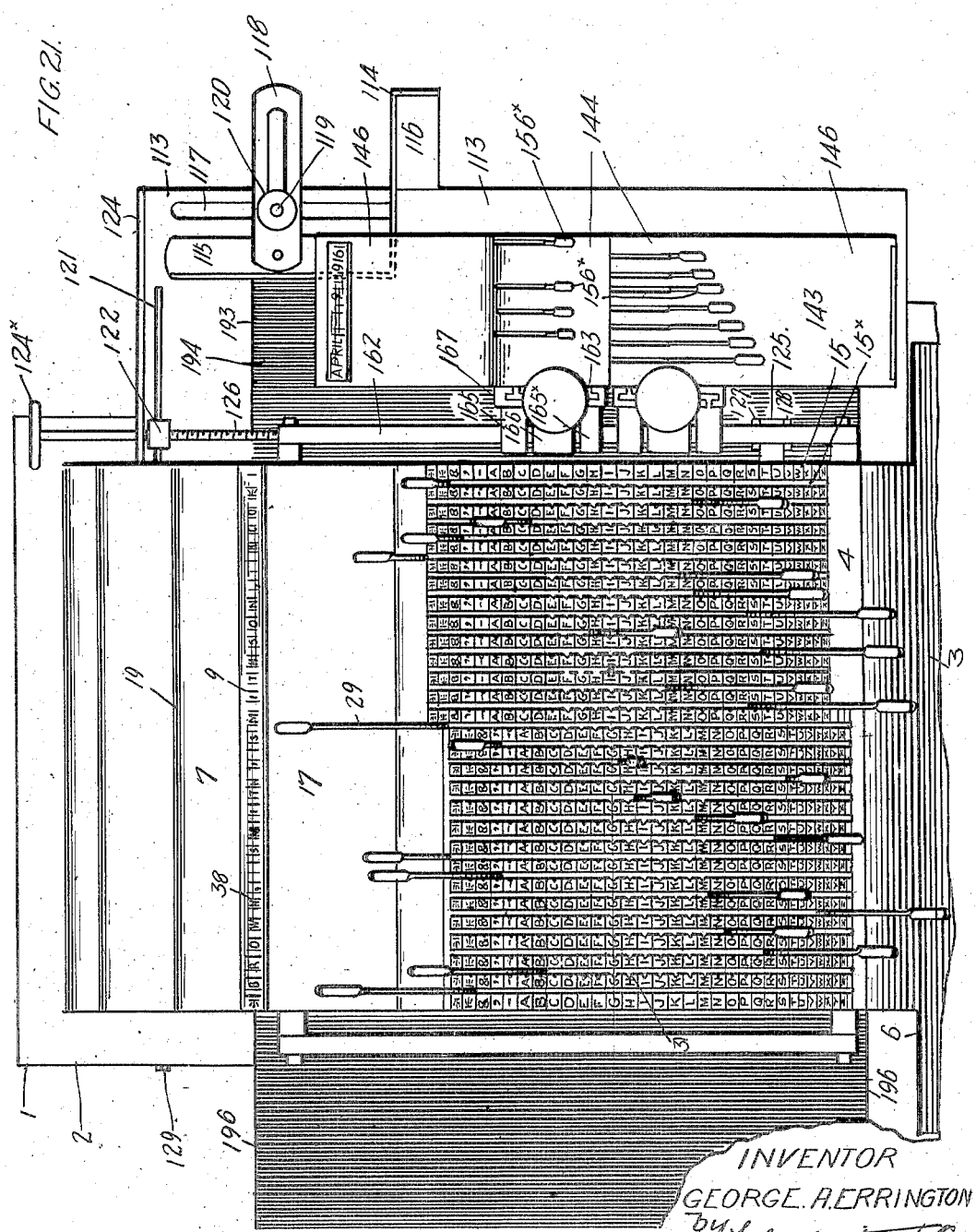

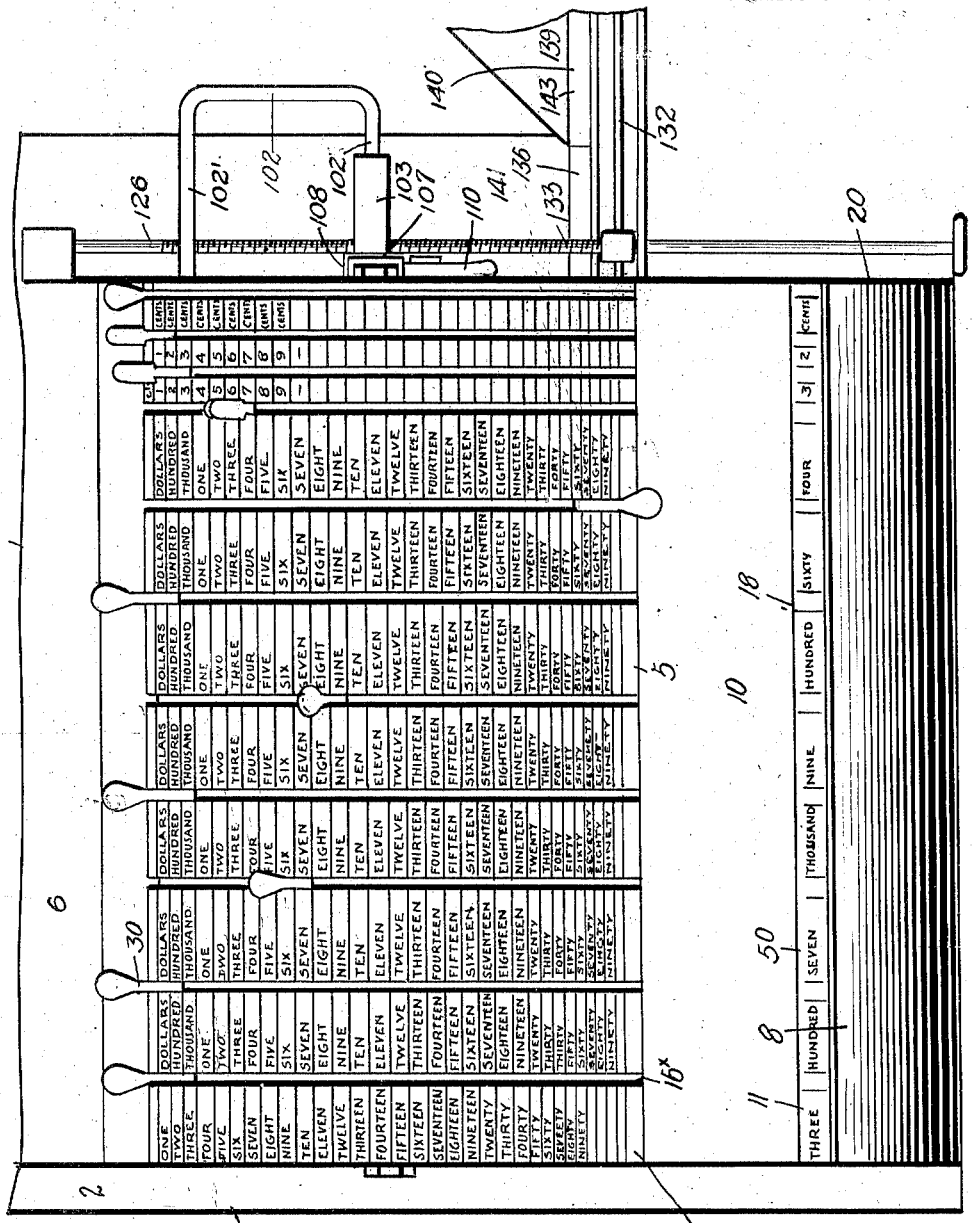

UNITED STATES PATENT OFFICE.

GEORGE ARTHUR ERRINGTON, OF BUFFALO, NEW YORK, ASSIGNOR, BY DIRECT AND MESNE ASSIGNMENTS, OF SIXTY PER CENT. TO WILLIS E. WATERMAN AND TWENTY PER CENT. TO MAUDE E. WATERMAN, BOTH OF BUFFALO, NEW YORK.

CHECK-WRITING MACHINE.

1,308,149.     Specification of Letters Patent.     Patented July 1, 1919.

Application filed November 25, 1916, Serial No. 133,456. Renewed May 15, 1919. Serial No. 297,439.

*To all whom it may concern:*

Be it known that I, GEORGE ARTHUR ERRINGTON, of the city of Buffalo, in the State of New York, United States of America, have invented certain new and useful Improvements in Check-Writing Machines, of which the following is the specification.

My invention relates to improvements in check writing machines and the object of the invention is to devise a simple form of machine that lessens the possibility of making mistakes and in which all the particulars of a bank check or draft of any size or design may be written upon the check in such a way that it will lessen the possibility of alteration by means of raising or forging of either the payee's name or amount on any portion of such written matter placed thereon by the maker, the fiber of the check destroyed by macerating, the ink being acid proof and it consists essentially of the following arrangement and construction of parts as hereinafter more particularly explained by the following specification.

Fig. 7, is a side elevation of the machine looking from the opposite side to that shown in Fig. 1.

Fig. 8, is a detail view of the means for spacing the type pieces for printing the amount of the check in words.

Fig. 9, is a fragmentary detail of a portion of the disk carrying the type pieces as shown in Fig. 8.

Fig. 10, is an enlarged face elevation of a segmental portion of one of the type carrying wheels shown in Fig. 8.

Fig. 11, is a sectional detail through the type mechanism for writing the date upon the check.

Fig. 12, is a perspective detail of the amount numeral writing mechanism looking from the inner side or from the opposite side to that shown in Fig. 1.

Fig. 13, is an end elevation of the mechanism shown in Fig. 12.

Fig. 14, is a sectional detail of the inking rollers and supports therefor.

Fig. 15, is a plan view partially in section of the dating mechanism.

Fig. 16, is a vertical section through the dating mechanism showing the type band, supporting rollers and adjacent parts in full.

Fig. 17, is a detail of one of the vertical guide brackets for supporting the dating mechanism.

Fig. 18, is a perspective detail of the major portion of one of the operating levers of the dating mechanism.

Fig. 19, is a sectional detail of the spring clip for holding the check blank in position during the printing of the amount in words thereon.

Fig. 20, is a detail view of one of the operating levers showing the means for bringing the lever to its exact correct position after each movement.

Figs. 21 and 22 are similar views to Figs. 4 and 5 showing the mechanism in position for printing.

In the drawings like letters of reference indicate corresponding parts in each figure.

Figure 1:
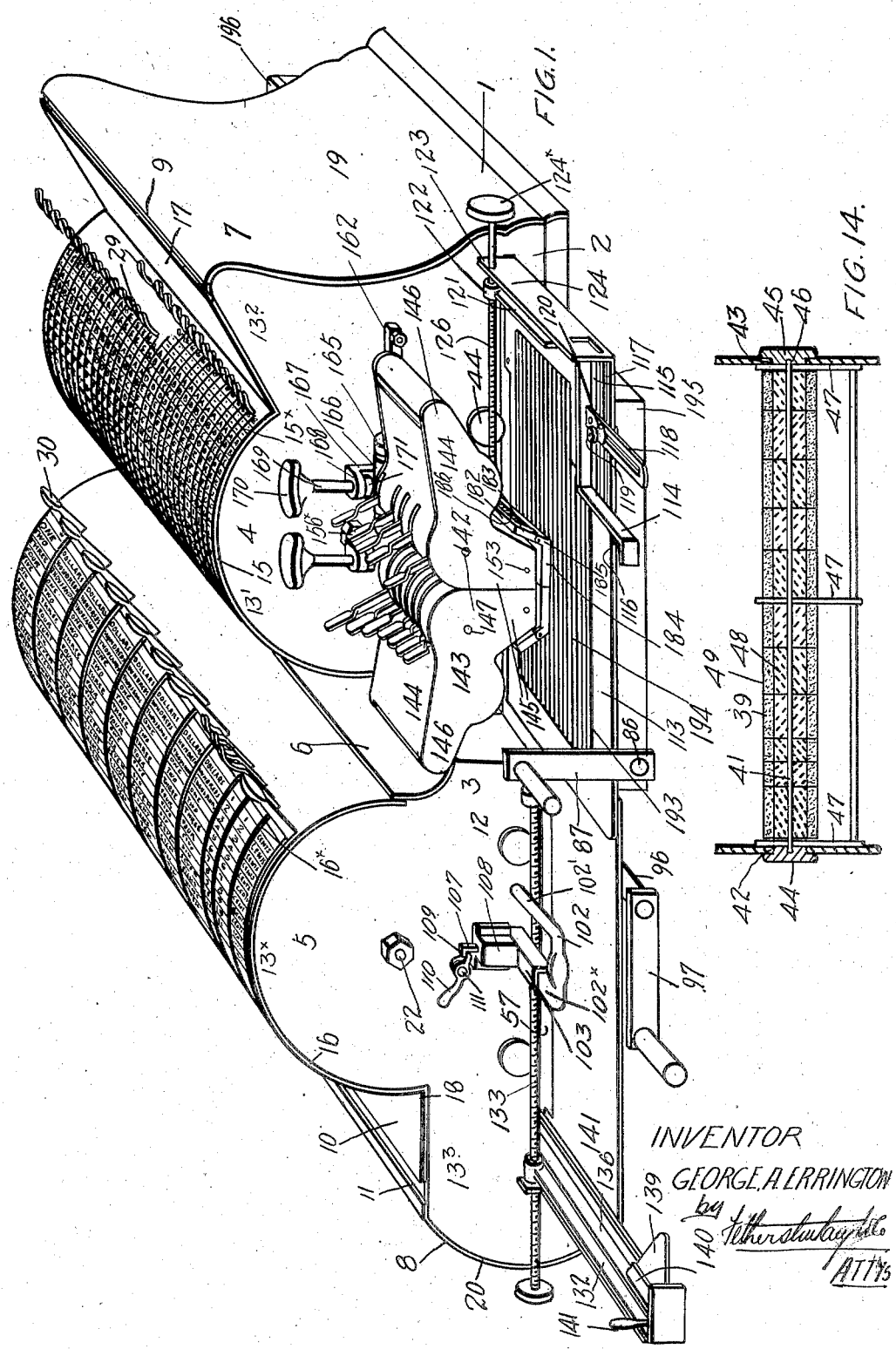
Figure 1, is a general perspective view of my device.
Figure 2:
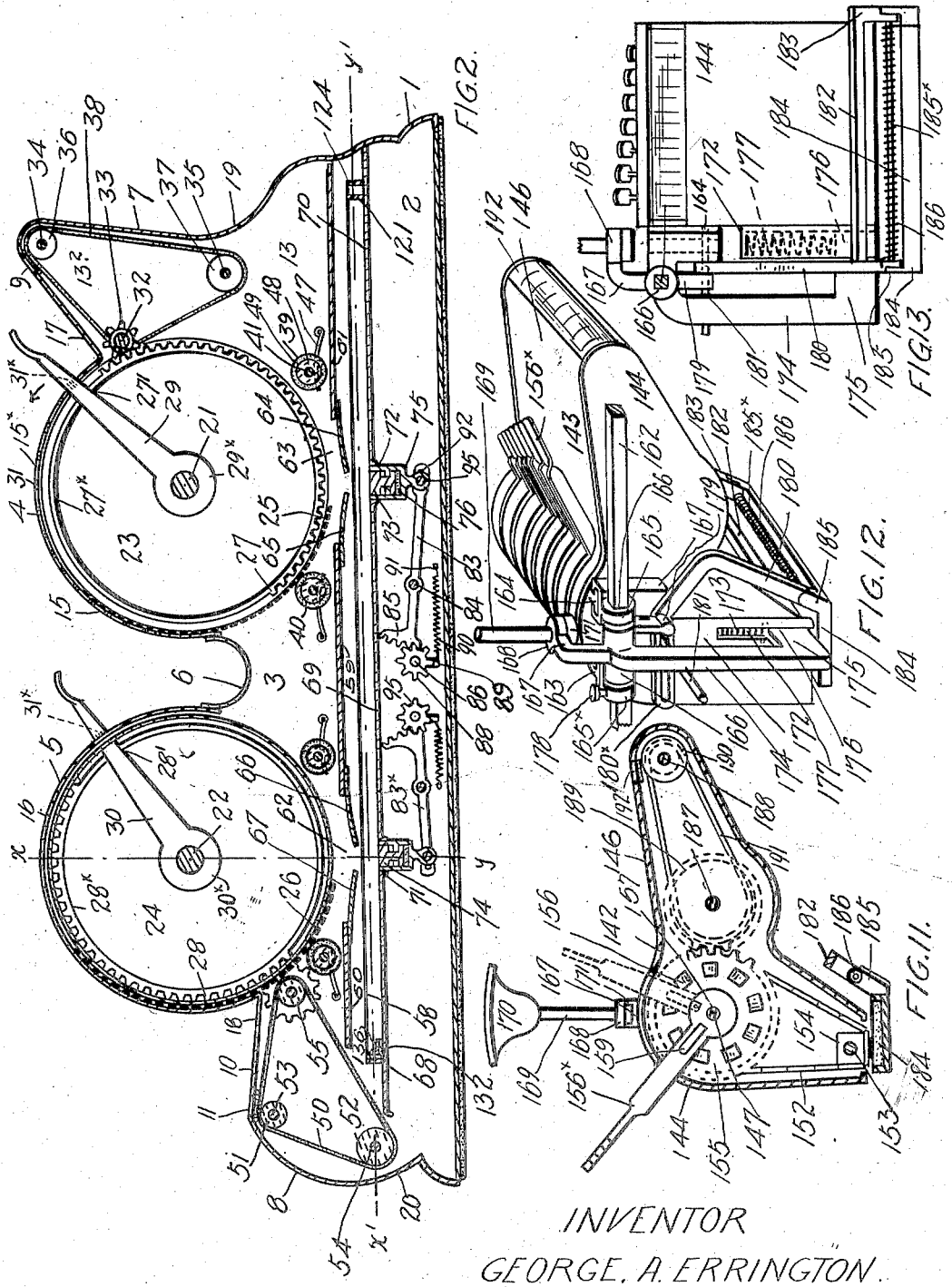
Fig. 2, is a longitudinal section through Fig. 1.
Figure 3:
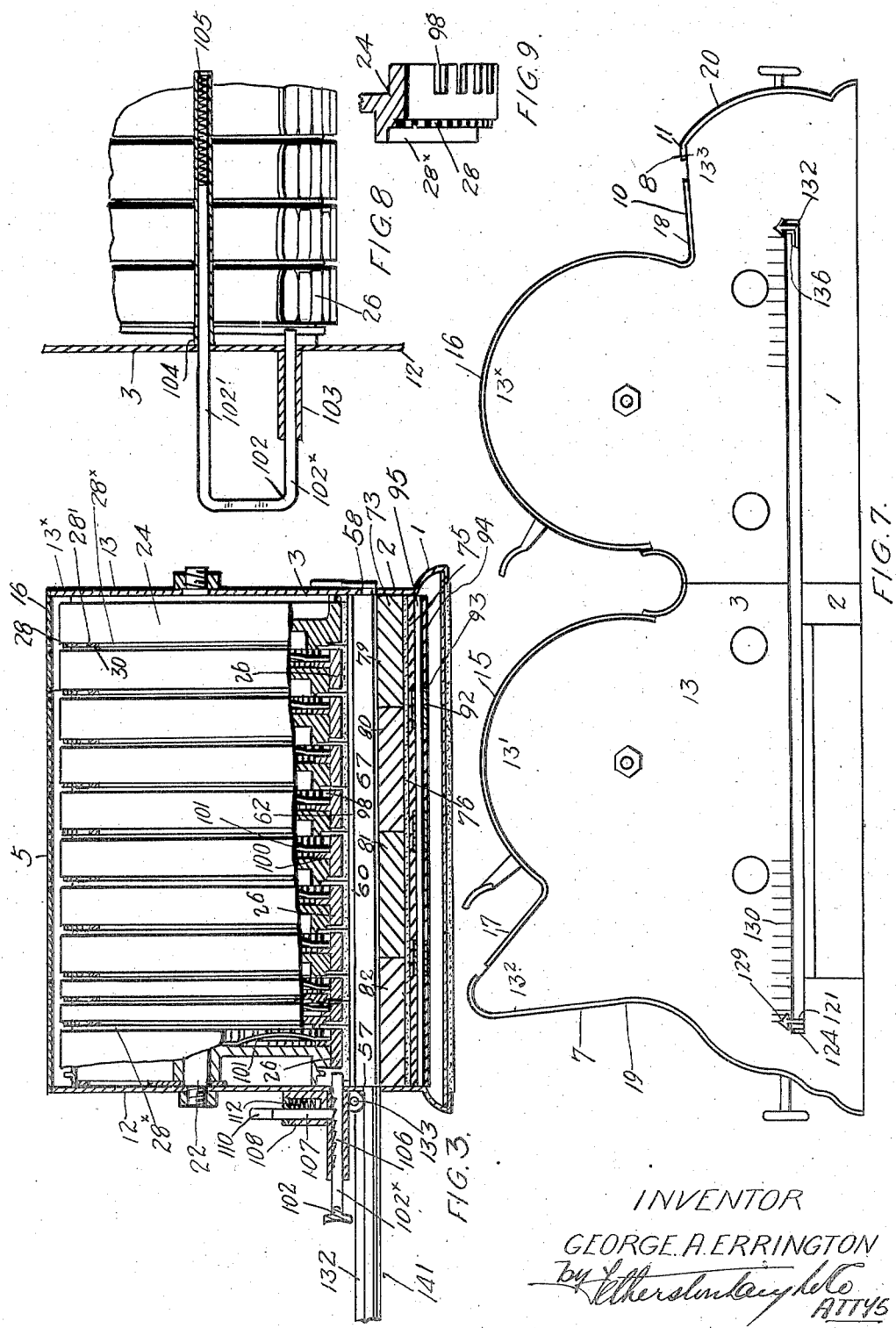
Fig. 3, is a cross section on line $x$—$y$ Fig. 2, showing the type in the printing position.
Figure 4:
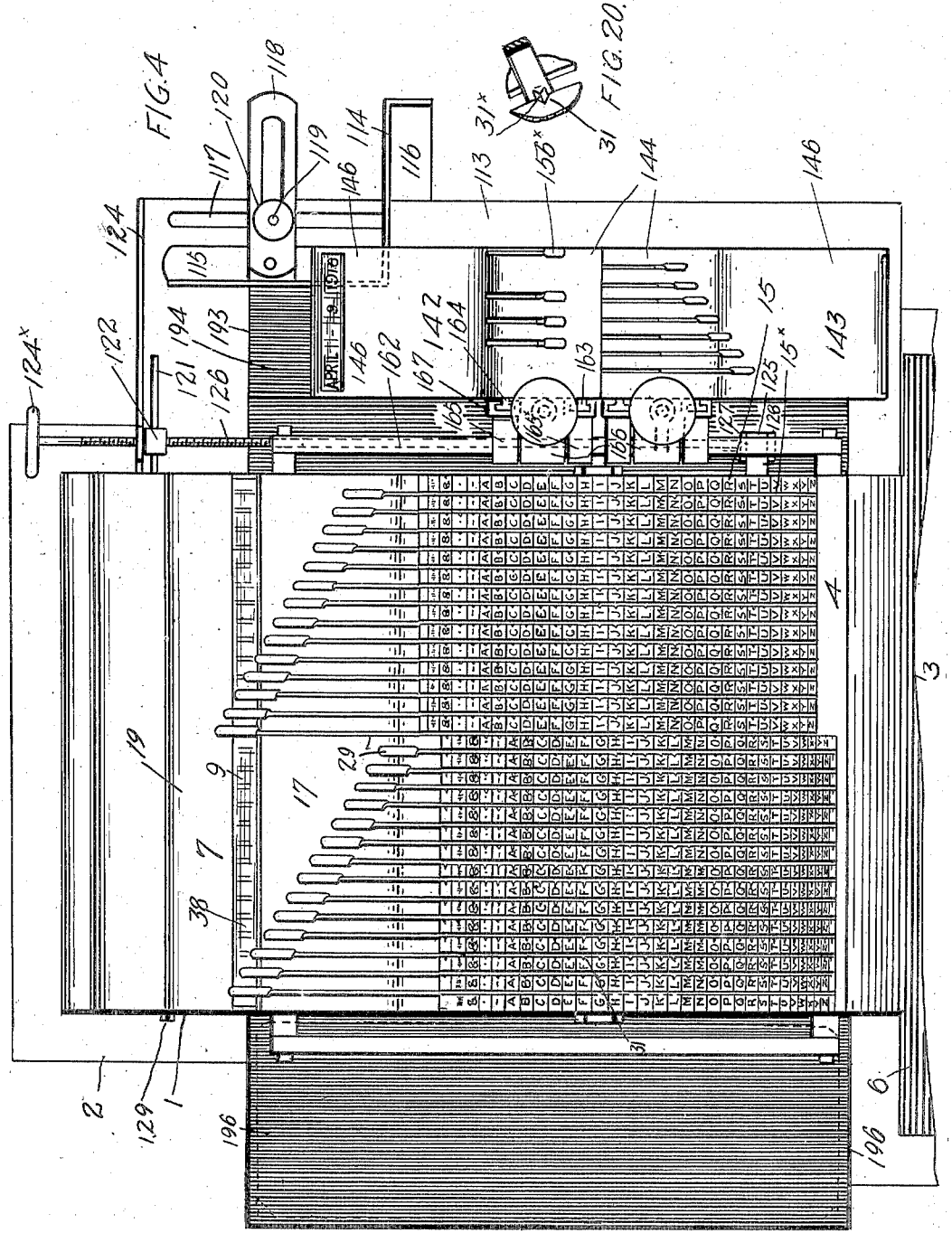
Figs. 4 and 5 are enlarged plan views of the right and left hand portions of the machine shown in normal position.

1 indicates the body of the machine which comprises the base portion 2 and an upper portion 3 formed by the type wheel casings 4 and 5 connected together centrally of the machine by a U-shape piece 6 and endless band casings 7 and 8 formed at each end of the machine. The band casing 7 extends upwardly at an incline from the casing 4 forming a projection acute angular in cross section having a longitudinal inspection slot 9 formed in the inclined face extending from the type casing 4. The band casing 8 is provided with a substantially horizontal upper face 10 provided with a longitudinal inspection slot 11 extending from end to end of the machine. The sides of the machine body 1 are formed by side plates 12 and 13 having portions 13′ and 13ˣ extending upwardly, the outer edges thereof being arc-shape, the cover plates 15 and 16 fitting over the edges of the portions 13′ and 13ˣ thereby forming the type casings 4 and 5, the portion 15 being provided with an inclined extension 17 fitting against the upper edge of the portion 13² of the side plates, the portion 16 being provided with an extension 18 fitting at the upper edge of the portion 13³ of the side plates so as to form the top portion of the band casing 8. 19 and 20 indicate the end walls of the body portion which fit against the end edges of the side plates 12 and 13 and extend upwardly from the bottom thereof, the upper edges being spaced slightly apart from the opposing edges of the portions 17 and 18 so as to form the longitudinal inspection slots 9 and 11 hereinbefore referred to. The cover 15 is provided with a series of parallel arc-shape slots 15ˣ and the cover piece 16 with parallel arc-shape slots 16ˣ for a purpose which will hereinafter appear.

21 and 22 indicate stationary shafts secured in the side walls 12 and 13 of the body portion 1 in a position concentric with the center of the arc-shape covers 15 and 16. 23 indicate a series of type wheels mounted upon the shaft 21. 24 indicate a series of type wheels mounted upon the shaft 22. 25 indicates the type on the type wheel 23 and 26 indicates the type on the type wheel 24. This type may be formed up on the periphery of the type wheels 23 and 24 or formed on a separate band which is secured to the periphery of the type wheel as may be found most convenient in the manufacture. 27 indicates a gear formed integral with each type wheel 23. 28 indicates a gear formed integral with the type wheel 24.

It will be noticed that the gears 27 and 28 are formed on the flanges 27ˣ and 28ˣ extending outwardly from the face of each type wheel 23 and 24. 27' and 28' indicate notches formed respectively in the flanges 27ˣ and 28ˣ. 29 and 30 indicate the operating levers by which the type wheels 23 and 24 are turned to the required position. The levers 29 and 30 are provided with washer-shape inner ends 29ˣ and 30ˣ through which the shafts 21 and 22 are inserted so a lever 29 and 30 is located respectively between each pair of type wheels 23 and 24. The operating end of the lever 29 projects through the slots 15ˣ and the operating end of the lever 30 projects through the slots 16ˣ as will be clearly seen on referring to Fig. 1.

It will be noticed that when the levers are placed in position between the type wheels that the inner ends thereof are held definitely in position from movement longitudinally on the shafts 21 and 22. It will also be understood that the levers 29 and 30 are made of spring metal. In one inner edge of the slot 15ˣ are formed a series of V-shape notches 31. Between each slot 15ˣ on the outer face of the cover 15 are inscribed the letters of the alphabet and any other signs or marks necessary for the printing of the name of the payee of a check such as a hyphen, period, &c., and a suitable protection mark utilized for filling in the blank space at each end of the name of the payee. The type 25 on the type wheels 23 are provided with similar letters and signs and are so arranged that when a lever 29 is swung in the direction of arrow to a position opposite a letter inscribed on the cover 15 that the same letter in the type 25 is brought directly vertically underneath the center of the type wheel.

In order to insure that the type is correctly centered in position each spring lever 29 is provided with a V-shape projection 31ˣ which springs into a corresponding notch 31 formed opposite the corresponding letter in the type wheel cover 15. 32 indicates a shaft journaled in the sides 12 and 13 of the casing in proximity to the periphery of the type wheels 23. 33 indicate a series of gear pinions mounted upon the shaft 32, a gear pinion 33 engaging with each gear portion 27 of each type wheel 23. 34 and 35 indicate rods also mounted upon the sides 12 and 13. 36 and 37 indicate idler rollers freely mounted upon the rods 34 and 35 opposite each gear pinion 33. 38 indicates an endless band which extends around the hub of the gear pinion 33 and around the idler pinions 36 and 37. Upon the outer face of the band 38 is inscribed the letters and signs corresponding to the letters and signs inscribed on the type casing 15, these letters and signs being so arranged and the gears 27 and 33 so proportioned that when the type wheel 23 carries any particular letter to the printing position, that is, vertically underneath the center of the type wheel that the same letter is carried by the band 38 opposite the slot 9. It will, therefore, be seen that when the type wheels are operated so that the letters carried to the printing position form a name that the same name will appear through the slot 9 to the operator of the machine or to any person who is observing the operation of the machine.

Figure 5:
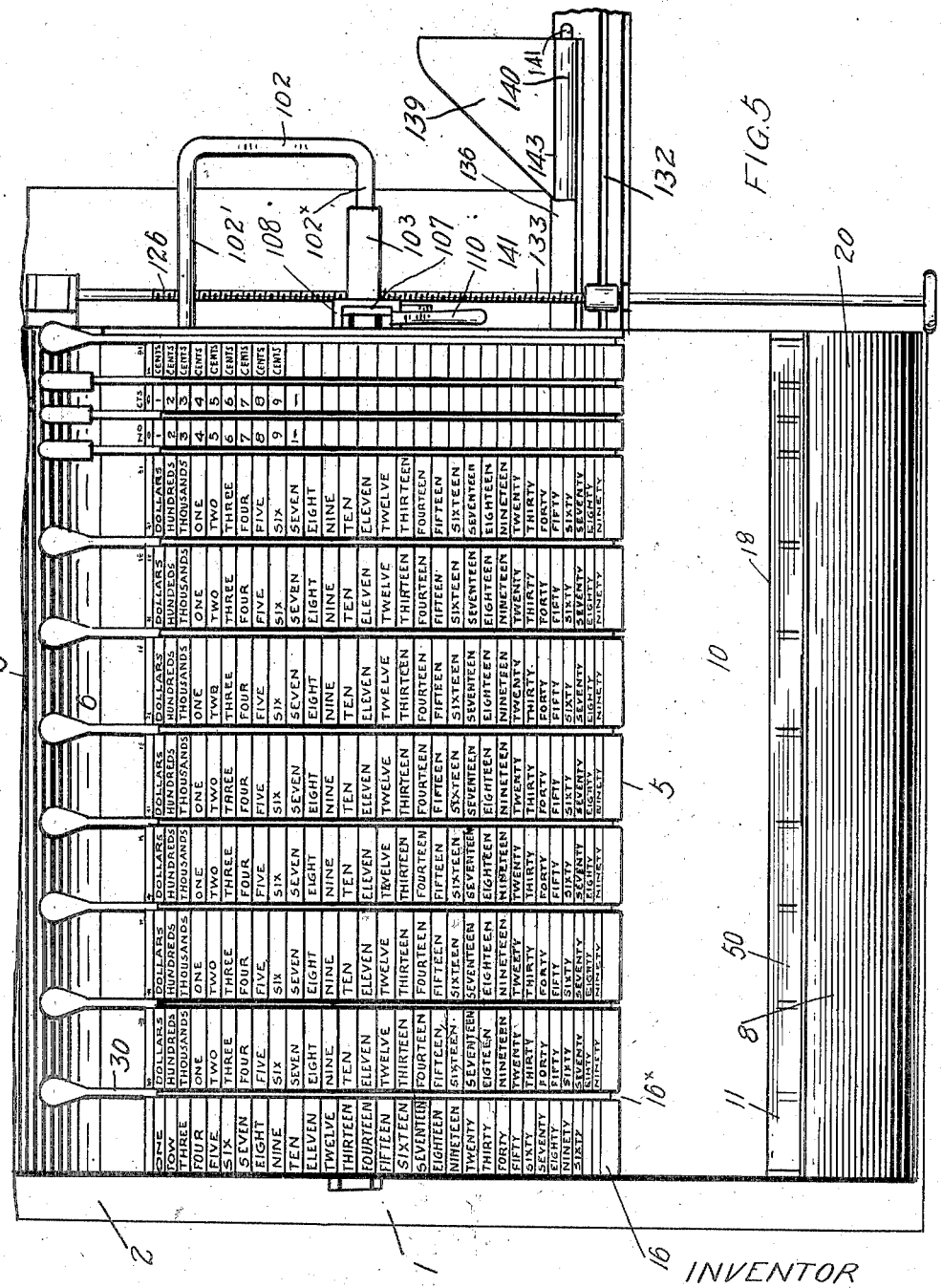
Figure 6:
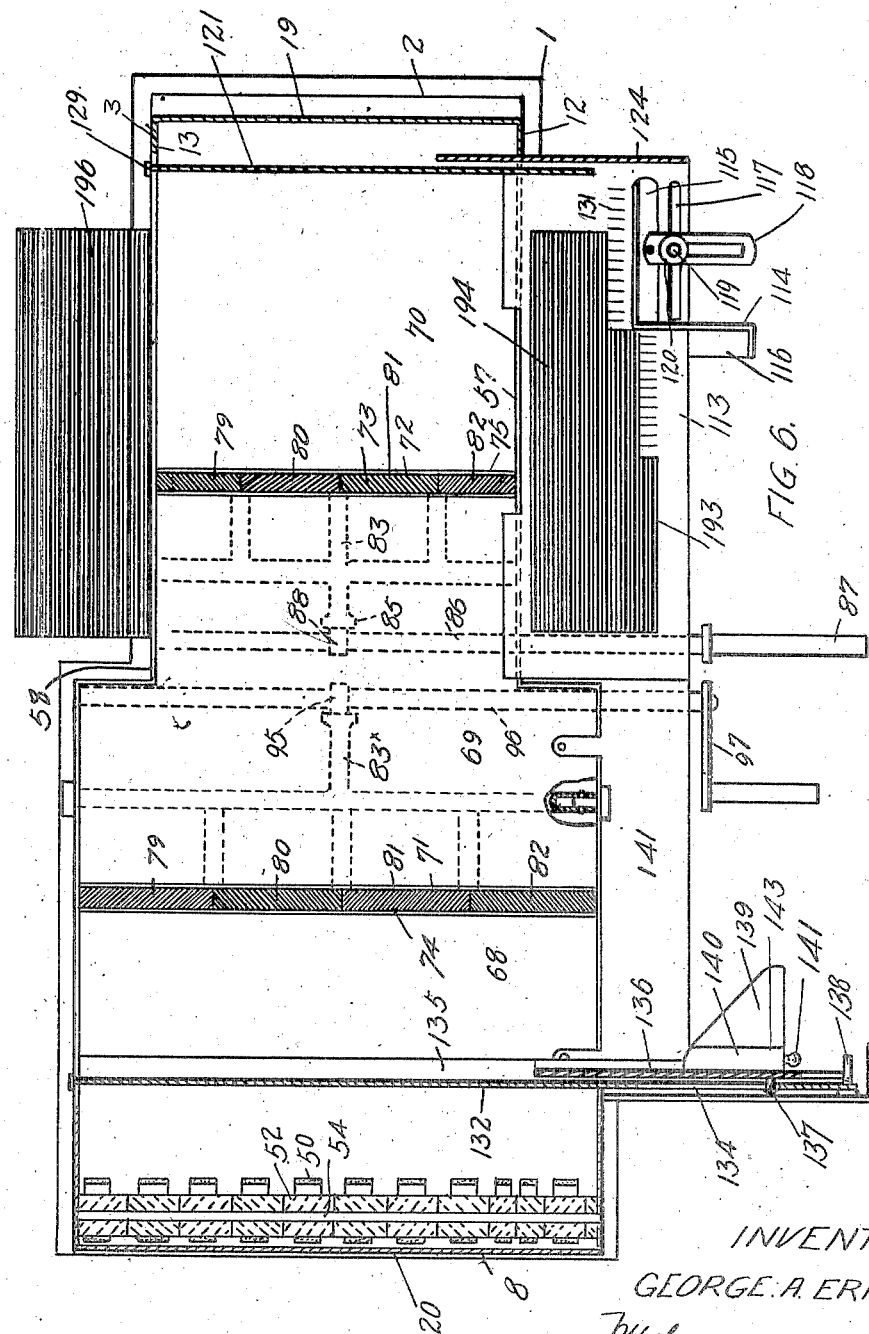
Fig. 6, is a sectional plan on line $x'$—$y'$ Fig. 2.

39 and 40 indicate the inking rollers whereby ink is supplied to the type 25. The inking rollers 39 and 40 are held in position on a wire rod 41. 42 and 43 indicate orifices formed in the side walls 12 and 13 of the body of the machine. 44 indicates a cap which is suitably secured in the orifice 42 either by being screwed thereinto or otherwise secured in position and to the inner face of which the corresponding end of the rod 41 is secured. A similar cap 45 is secured in the orifice 43 and is provided with a recess 46 into which the opposite end of the wire rod 41 extends. 47 indicate a series of spring fingers which bear against the lower face of the rod 41 so as to slightly spring the rollers upward into contact with the type wheel so as to insure of the thorough inking of the type. The type rollers 40 are formed by internal cores 48 on which is secured felt 49 designed to absorb the printing ink. The means of operating type wheels 24, by the levers 30 and inking rollers co-acting therewith correspond in construction to that described in connection with the type wheels 23, operating levers 29 and inking rollers 39 and it is, therefore, thought to be unnecessary to describe the same in detail with the exception that it may be said that the slots 16<sup>x</sup> are placed at such a distance apart and the type wheels are of such width as to accommodate the length of all words necessary to print the amount on the check in words, that is to say, by referring to Fig. 5 it will be seen that the uppermost column contains the numbers of words from one to sixty, the next seven columns containing the protection marks necessary to be printed at each end of the printed amount, the words dollars, hundreds and thousands and the ninth and tenth columns containing the numerals from naught to nine to be used for printing the cents in numerals, it being unnecessary to print the amount of cents in words and the last column containing the word "cents" corresponding to each numeral of the ninth and tenth column.

50 indicate a series of endless bands similar to the bands 38 hereinbefore described, such bands being mounted on rollers 51 and 52 carried by the rods 53 and 54 secured in the side plates 12 and 13 and upon the hub 55 of the gear pinion 56 which meshes with the gear wheel 28 of the type wheel 24. Each band 50 has inscribed on its outer face the words corresponding to the words carried by the cover 5 and by the type wheel 24, such words being so spaced upon the bands and the gear wheels 56 and 28 so proportioned that when a word on the type wheel is brought to the printing position or vertically underneath the center of the shaft the same word on the band 50 is brought beneath the slot 53.

57 and 58 indicate slots formed in the side walls 12 and 13 and through which the check blank is passed for the purpose of printing. 59, 60 and 61 indicate plates secured between the side plates 12 and 13 to form a dividing partition between the upper portion of the casing containing the type wheels and the lower portion of the casing containing the slots 57 and 58. The plates 59, 60 and 61 are so arranged as to form cross slots 62 and 63 located between each type wheel 23 and 24. 64 and 65 indicate spring plates secured to the plates 59 and 61 at each side of the slot 63, the space between the inner ends of the spring plates being substantially equal to the width of each piece of type on the type wheel. 66 and 67 indicate similar spring plates secured to the plates 59 and 60 at each side of the slot 62. 68, 69 and 70 indicate plates also secured to the side plates 12 and 13 of the casing, the upper faces of such plates being flush with the lower edge of the slots 57 and 58. The plates 68, 69 and 70 form when in position the cross slots 71 and 72 located centrally beneath the center of the type wheels 23 and 24. 73 and 74 indicate macerating bars which are forced against the check blank during the printing operation. The macerating bars are formed by a channel member 75 in the bottom of which is located a cushioning strip 76 of rubber or other suitable material. The macerating bars 73 and 74 fit into the channel 75 and upon the cushioning member and are formed by a series of sections 79, 80, 81 and 82, the upper face of which is provided with suitable sharp serrations for cutting the blank of the check during the printing. 83 indicates a lever mounted upon a rod 84 carried by the side plates 12 and 13. The inner portion of the lever is provided with a quadrantal gear 85. 86 indicates a shaft also journaled in the side plates 12 and 13 and provided at its outer end with a crank handle 87 for turning the same. 88 indicates a gear pinion secured to the shaft 86 and meshing with the gear quadrant 85. 89 indicates a piece depending from the hub of the gear pinion 88. 90 indicates a tension spring secured at one end to the piece 89 and at the opposite end to a cross rod 91 or any other suitable member for holding the spring in place. The opposite end of the lever 83 is slotted at 92 and extends through the notches 93 formed in the depending piece 94 formed integral with the channel 73. The piece 94 is bored longitudinally through which bore a rod 95 extends, such rod passing through the recess 93 and through the slots 92 thereby forming a flexible hinge connection between the lever 83 and the channel piece 75. The channel piece 74 is operated by a lever 83<sup>x</sup> similar to the lever 83, the lever 83<sup>x</sup> being operated by a pinion 95 mounted upon a shaft 96 operated by the crank handle 97.

I will now describe the construction of the type wheels 24 which differ from the type wheels 23. In the type wheel 23 the type is secured to the wheel in a stationary position whereas the type 26 of the type wheel 24 must be slid longitudinally after being set so as to equalize the space between the words where the words are of different lengths. For a simple illustration it will be readily seen that it will be necessary to have the type closer together when printing the number sixty-one, the number sixty appearing on one type wheel and the number one on the next adjacent type wheel than would be necessary when printing the amount seventeen hundred, the number seventeen appearing on one type wheel and the number one hundred appearing on the next type wheel.

In order to allow of the type being adjusted so that the words always appear an equal distance in correct relation one from the other I have provided the following construction.

The periphery of each type wheel is connected to the central portion or hub of the wheel by a web or spokes of any desired shape. It will thus be seen that the periphery of the wheel overhangs the central portion or web of the wheel at each side. The overhanging portion at one side of the center of the wheel is provided with a series of open ended slots 98 (see Figs. 9 and 10). 26 represent the type pieces. Each type piece is provided with an inwardly extending lug 100, which in its normal position bears against the inner end of the slot 98 being held in such position by a leaf spring 101. These springs may be formed individually and secured separately at their inner ends to the center portion of the wheel or formed with an annular connecting portion at its inner end extending around the hub of the wheel and secured thereto. 102 indicates a U-shape plunger slidably held in bearings 103 and 104 carried by the side plate 12 of the machine. The inner end of the arm 102ˣ of the plunger is located directly opposite the printing position of the type 28. 105 indicates a compression spring held in the bearing 104 and against which the other arm 102′ of the plunger 102 bears. The upper face of the arm 102ˣ is provided with a ratchet 106. 107 indicates a spring plunger held in a bearing casing 108 and provided with a lower ratchet shape end engaging with the ratchet 106. The upper end of the spring plunger 107 is provided with a right angular portion 109 against which an operating lever 110 pivoted at 111 bears so as to lift such end upwardly when the lever 110 is depressed against the pressure of the spring 112.

I will now describe the means by which the check blank is supported in position during the operation of printing the name of the payee and the amount of the check.

113 is a table, the inner edge of which extends into the slot 57, such edge being countersunk into the plates 69 and 70 so as to make a flush surface. 114 indicates a gage piece substantially Z-shape in form and provided with a horizontal flange 115 and a horizontal flange 116. The upper face of the flange 116 is flush with the upper face of the table 113. 117 indicates a slot formed in the table 113 in proximity to its outer edge, such slot extending parallel with the mouth of the slotted opening 57 and 118 indicates a slotted bar secured to the horizontal flange 115. The bar 118 is secured in place by a set screw 119 extending through the slot thereof and through the slot 117, the head of the screw bearing against the lower face of the table 113. 120 indicates a nut which is screwed on to the upper end of the set screw against the bar 118. By this means the gage device formed by the piece 114 and bar 118 may be adjusted either crosswise or longitudinally of the machine so as to suit the size of any individual check. 121 indicates a movable strip held in a vertical position and extending from side to side of the machine through the slots 57 and 58. 122 indicates an internally threaded sleeve formed integral with the strip 121. 123 indicates a bearing piece formed by the upturned flange 124 forming one end of the table 113. 125 indicates a bearing sleeve carried by the side of the machine. 126 indicates a threaded spindle extending into the bearing sleeve 125 at its inner end. 127 and 128 indicate collars secured to the spindle 126 at each end of the bearing sleeve 125 thereby preventing the longitudinal movement of the threaded spindle 126. The threaded spindle 126 passes through the internally threaded sleeve 122 and is provided at its outer end with a head 124ˣ preferably provided with a knurled periphery whereby it may be readily turned between the thumb and finger so as to carry the strip 121 to any position desired extending crosswise of the machine. The opposite end of the strip 121 is provided with a pointer 129 which co-acts with a graduated scale 130, the opposite end of the strip co-acting with a correspondingly graduated scale 131 thus insuring that the strip 121 is held in position extending directly at right angles to the side of the machine and parallel with the axis of the type wheels so as to hold the check blank in the required relative position thereto. 132 indicates a strip extending crosswise of the machine through the slots 57 and 58 in proximity to the opposite end thereof. The strip 132 is adjusted longitudinally of the machine by a threaded spindle 133 similar to the spindle 126 hereinbefore described. The outer end of the strip is provided with a longitudinal slot 134. The strip 132 is provided with a horizontal extension 135 extending inwardly of the machine. 136 indicates a supplemental strip carried upon the portion 135 of the strip 132, the portion 136 being provided with a headed pin 137 extending through the slot 134. 138 indicates a set screw extending through the outer end of the strip 132 and designed to limit the outward movement of the supplemental strip 136. 139 indicates an extension piece carried by the supplemental strip 136, such extension being provided with a spring clamp 140 shown in detail in Fig. 19.

141 indicates a lever extending into the clamping member 140 and provided with an eccentric portion 142 by which the clamp may be sprung upward so as to carry the depending portion 143 thereof out of contact with the portion 139. 141′ indicates a table which is also secured in the slot 57 and countersunk in the plates 68 and 69.

When the amount of the check is to be printed upon the check blank the blank is passed through the slot 57, the length of the blank extending crosswise of the machine. The outer lateral edge of the blank is then inserted in the clamp 140, the lever 141 being thrown down so as to free the clamp so that the inner edge thereof has a spring tension against the portion 139. By this means the check blank is held rigidly in position.

I will now describe the dating mechanism and the mechanism for printing on the amount of the check in numerals.

142 indicates the dating mechanism and 143 the mechanism for printing on the amount in numerals. It may be said that these mechanisms are identical with the exception that the number of type mechanisms and actuating levers employed in each mechanism varies according to the purpose for which it is employed, that is to say, in the dating mechanism there must be a type mechanism for the month, two mechanisms for the day and a mechanism for the year. In the mechanism for printing the amount there must be a printing mechanism for the numerals, for the tens, hundreds, thousands, tens of thousands, hundreds of thousands and millions. These mechanisms are otherwise the same and I, therefore, only describe the construction and operation of one set thereof.

144 indicates the casing of the mechanism 142 or 143, the main body of which is cylindrical and provided with a depending portion 145 and a rearward extension 146. 147 indicates a shaft journaled centrally in the body 144 of the casing. 148, 149, 150 and 151 indicate the drums of the dating mechanism freely mounted upon the shaft 147 and designed to carry the upper portion of the type belt 152. 153 indicates a shaft journaled in the casing in proximity to the mouth of the depending portion 145. 154 indicate a series of rectangular blocks mounted freely upon the shaft 153, the sides of the blocks being equal in width to the width of the individual type forming the type chain 152. It will, therefore, be seen that the endless chain forming the type belt extends at its upper end around one of the drums 148, 149, 150 or 151 and at its lower end around a block 154. It will, of course, be understood that there is a block 154 and type belt 152 corresponding to each of the drums. Secured to each drum 148, 149, 150 and 151 is a gear wheel 155. 156 indicate an annular series of ratchet teeth extending from the outer face of each gear 155. 156× indicates an operating lever provided with a disk-shaped inner end 157 having a central orifice 158 through which the shaft 147 extends. 159 indicates a spring finger carried by each lever 156×. 160 indicates an orifice in the arm of the lever through which the pin 161 slidably extends and against the outer end of which the free end of the spring 159 bears.

It will be noticed that the drums 149 and 150 and 151 are recessed so as to allow of the free inward movement of the spring fingers 159. By swinging the operating lever 156× in opposite directions it alternately engages the ratchet teeth 156 when moving in one direction and passes freely over them when moving in the opposite direction and thereby moving the type one space at each motion of the lever. The mechanisms 142 and 143 are mounted upon the machine in the following manner.

162 indicates a rectangular bar mounted upon the side plate 12 of the machine and clear of the face thereof. 163 and 164 indicate T-ribs extending from the inner face of each mechanism 142 and 143. 165 and 165× indicate collars having rectangular orifices 166 slidably mounted upon the rod 162. 167 indicates a T-shaped guideway formed integral with each collar 165 and 165× and in which the T-ribs 163 and 164 are slidably held so as to have vertical movement therein. 166 indicates a sleeve also provided with a rectangular orifice and mounted upon the rod 162 between the collars 165 and 165×. 167′ indicates a standard extending upwardly from the sleeve 166 and provided at its upper end with a horizontally extending bearing collar 168. 169 indicates a push plunger provided with an operating knob 170 at its upper end and a head 171 at its lower end. 172 indicates a cylindrical member secured rigidly to the inner face of the casing of the type mechanism and provided with a vertical slot 173, an open lower end and a closed upper end. 174 indicates a hanger depending from the sleeve 166 and provided with an inwardly extending portion 175 at its lower end terminating in a cylindrical portion 176 fitting within the cylindrical member 172. 177 indicates a compression spring held within the cylindrical member 172 and extending between the closed upper end thereof and the upper end of the portion 176. 178 indicates a set screw by which the mechanism is locked in position upon the rod 162. 179 indicates a supplemental hanger depending from the sleeve 166. 180 indicates a bell crank lever provided with a horizontal arm 180× at its upper end having a longitudinal side slot therein. 181 indicates a pin extending from the side wall of the mechanism 142 or 143 through the slot. 182 indicates an arm extending laterally from the bell crank and provided at its outer end with a downward extension 183. 184 indicates an inking pad provided with lugs 185 through which and the lower end of the bell crank 180 and the downward extension 183 extends a spindle 185ˣ. 186 indicates a tension spring surrounding such spindle, one end of the spring being carried upward and bearing against the back of the bell crank and the opposite end against the back of the inking pad. By this means the inking pad is resiliently held in position so as to bear against the type when brought into contact therewith.

In order to exhibit the date and numerals representing the amount of the check to the operator I have provided the following mechanism.

187 indicates a spindle journaled in the extension 146 of the casing 144. 188 indicates an idler spindle also journaled in the extension 146. 189 indicates a gear wheel meshing with each gear wheel 155 hereinbefore described. 190 indicate rollers mounted upon the spindle 188, and 191 indicate endless bands on which, in the case of the mechanism 142, is printed the months, days and years and in the case of the mechanism 143 the various numerals indicating the amount of the check, such dates and numerals corresponding to the dates indicated by the type bands and the gearings 189 and 155 being so proportioned that when any particular type is brought into the printing position a corresponding number or date is indicated by the bands through the exhibiting slot 192.

In the mechanism 142 the exhibiting slot is located on the upper face of the extension 146 whereas in the mechanism 143 the slot is at the end of the extension so that the date and number exhibited through each slot may be seen from the left hand end of the machine.

The table 113 is provided with a substantially rectangular orifice 193. 194 indicates a plate forming a macerating table which fits into the orifice 193 and is supported by the supplemental frame 195 secured to the side of the machine. 196 indicates a macerating table located at the opposite side of the machine and is similarly supported for a purpose which will hereinafter appear.

Having described the principal parts involved in my invention I will briefly describe the operation of the same.

The check blank is first placed upon the macerating table 193. The operating levers 156ˣ of both the mechanism 142 and 143 are operated to bring the required number and date into position. The set screw 178 is loosened so that the mechanisms 142 and 143 may be slid longitudinally of the rod 162 to the required position over the date line and amount line of the check blank. The plungers 169 of each mechanism are then depressed in turn, the head 171 of each plunger coming into contact with the cylindrical portion 172 thereby forcing the same downwardly against the compression of the spring 177. The pin 181 descends with the casing of the type mechanism and thereby carries the slotted end of the bell crank 180 downwardly throwing the opposite end of the bell crank carrying the inking pad outwardly from the type mechanism. As the type mechanism continues to descend it comes into contact with the check blank in printing the amount thereon and simultaneously forcing the check blank into contact with the macerating plate which forms a series of fine parallel slits in the paper through the portion receiving the impress of the type. As soon as the plunger 169 is released the type mechanism is carried back to its normal position. The check blank is then passed farther into the slot 57 of the machine beneath the type wheels 23.

In order to get the check exactly in position so that the name of the payee when printed upon the check by means of the type reels 23 may be exactly in a line I place the end of the check against the gage piece 114, such gage piece being adjusted to the required position and then turn the spindle 126 to carry the strip 121 against the longitudinal edge of the check blank continuing this operation until the check blank is carried to such a position that the line for the payee's name is in such a position that it will be opposite the base of the type when the type are brought into position for printing or in other words so that the line upon which the payee's name is written is superimposed over the left hand edge of the macerating pieces 79, 80, 81 and 82. The levers 29 are then swung in the direction of arrow opposite the required letter indicated upon the cover 15, each lever being operated individually. When this is being done the type corresponding to the letters opposite each lever will be carried to the printing position, that is, to a position vertically underneath the center of the type wheel over the center of the macerating bars and at the right hand side of the line on the check blank on which the payee's name is usually written. The crank arm 87 is then turned toward the right hand end of the machine and toward a horizontal position thereby turning the shaft 86 against the tension of the spring 90 and simultaneously rotating the gear pinion 88 meshing with the gear quadrant 85 of the lever 83 thereby carrying the corresponding end of the lever in a downward direction and turning the opposite end of the lever upward and thereby carrying the macerating bars against the check blank and forcing it against the type.

It will, of course, be understood that in order to clearly illustrate the construction of the device the distances shown in the drawing are extremely exaggerated and in actual practice the upper face of the macerating bars and the type are very close to one another.

In order to prevent the type adjacent to the type which is in operation printing upon the check or smearing it I have provided the spring plates 64 and 65 which are forced upwardly by the macerating bars into contact with the type and completely cover the type at each adjacent side of the type which is in actual operation and thereby preventing any contact between the type not in operation and the check blank. When this operation is being completed the check blank is moved to the opposite end of the slot 57. The lever 141 is in the raised position so that the portion 143 of the spring clamp is out of contact with the portion 139. The edge of the check blank is then slipped over the portion 139 and below the portion 143. The lever 141 is then thrown down so as to release the spring portion 143 and allow it to bear upon the upper face of the check blank and grip it between itself and the portion 139. The gage piece 136 is then slid inwardly upon the portion 135 to the required position and the spring 126$^x$ rotated so as to carry the gage strip 132 into position to bring the line of the check blank on which the amount is written opposite the inner edge of the macerating portions of the macerating bar 74. The levers 30 are then operated and carried opposite the required amounts indicated upon the periphery of the cover 16 thereby carrying the corresponding type into the printing position over the macerating bar 74.

After this operation has been accomplished and all the type have been brought to the required printing position it is necessary, for the reason that all the type are of different lengths, to force the type so carried in a direction longitudinally of themselves or crosswise of the type wheels so that they will be properly spaced apart. In order to do this after the type have been brought to the printing position I force the plunger 102 inwardly carrying the inner end of the arm 102' thereof against the outermost type. All the type are carried by the spring fingers 101 with the exception of the type carried by the type wheel on the opposite end of the machine. These type are solid type. It will, therefore, be seen that when the plunger 102 is forced inwardly that the type carried by the spring fingers are carried longitudinally of themselves against the solid type at the opposite end of the machine and are thereby carried to the proper spacing position. The plunger 102 is locked in its innermost position by means of the spring member 107 so that the type is definitely held in position until after the printing operation is complete. As soon as the printing operation is complete the lever 110 is depressed so as to raise the member 107 out of contact with the ratchet teeth of the plunger member 102$^x$ thereby allowing the plunger to be carried back to its normal position by means of the spring 105. In printing the amount of the check it will, of course, be understood that a protection mark of any suitable design is printed upon the paper at each end of the written amount, such protection mark being macerated in the paper together with the amount thereby preventing any possibility of the amount being altered or otherwise tampered with. The crank arm 97 is then thrown up so as to operate the macerating bars in a similar manner to the macerating bars operated by the crank arm 87.

From this description it will be seen that I have devised a very simple form of machine by which a check may be completely filled out and all the parts so filled that there can be no possibility of the paper forming the blank being tampered with in any possible way and that by this machine all the particulars of each check as it is written out are present so as to be clearly visible to the eye of an observer watching the operation of the machine.

It will be noticed that the construction of the machine as above described would only be adaptable to the printing of United States checks. If it is desired to fill out a Canadian check the dating and mechanism for printing the amount in numerals would have to be mounted upon the opposite side of the machine and the macerating table, such as indicated at 196, employed. This, however, would only require a slight adjustment and does not in any way alter the operation of the machine and is only necessary because in Canadian checks the date and amount are often placed at the opposite end of the check to the end universally employed in United States checks.

What I claim as my invention is—

1. In a check writing machine, a main casing having a check insert slot in the side wall thereof, a series of type carriers mounted in the casing above the slot and having cross slots therein, type pieces having inwardly extending lug passing through the slot of the type wheel, spring means for holding the type in its normal position, and means for forcing a series of type when brought into longitudinal alinement longitudinally toward each other prior to the operation of printing.

2. In a check writing machine, a main casing having a check insert slot in the side wall thereof, a series of type carriers mounted in the casing above the slot and having cross slots therein, type pieces having an inwardly extending lug passing through the slot of the type wheel, spring means for holding the type in its normal position, means for forcing a series of type when brought into longitudinal alinement longitudinally toward each other, and releasable locking means for holding the type in such position during the operation of printing.

3. In a check writing machine, a casing having a check insert slot in the side wall thereof, a series of type wheels mounted in the casing and revoluble independently one of the other and means for independently revolving each type wheel so as to bring any series of type into alinement above the check insert slot, a series of type pieces, means for securing the type pieces to the periphery of the type wheels whereby each type is free to move crosswise of the periphery of the wheel, resilient means for holding the type normally in a central position upon the periphery of the type wheel, a plunger held in the side of the casing above the check insert slot longitudinally in alinement with the printing position of the type, and resilient means for holding the plunger normally in its outward position.

4. In a check writing machine, a casing having a check insert slot in the side wall thereof, a series of type wheels mounted in the casing and revoluble independently one of the other, means for independently revolving each type wheel so as to bring any series of type into alinement above the check insert slot, a series of type pieces, means for securing the type pieces to the periphery of the type wheels whereby each type is free to move crosswise of the periphery of the wheel, resilient means for holding the type normally in a central position upon the periphery of the type wheel, a plunger held in the side of the casing above the check insert slot longitudinally in alinement with the printing position of the type, resilient means for holding the plunger normally in its outward position, and locking means for holding the plunger in its inward position after forcing the type longitudinally, and means for releasing such locking means.

5. In a check writing machine, the combination with the macerating plate, of a dating or numbering mechanism yieldably supported above the macerating plate and comprising a series of drums mounted upon a suitable shaft, a series of rectangular blocks independently and revolubly mounted upon the shaft beneath the drums, a flexible endless type belt extending around each drum and block, a lever for each drum swingably mounted concentrically to the drum axis, coacting means carried by the lever and drum whereby the lever engages the drum during the movement in one direction and rides free of the drum during movement in the opposite direction, a casing for the dating or numbering mechanism having an extension with an inspection slot therein, of a series of indicating belts revolubly mounted and numbered or dated to correspond with the numbers or dates of the type belts, and means for turning each belt operated by the turning movement of the drums whereby the dates or numbers on the belts corresponding to the type carried to the printing position are carried opposite the inspection slot, and means for inking the type after each printing operation.

6. In a dating or numbering mechanism, a casing, a series of type belts revolubly mounted within the casing, means for independently revolving each type belt to bring the required type to the printing position, resilient means for supporting the casing, means for depressing the casing against such resilient means, an inking pad normally held against the face of the type when in the printing position, a bell crank pivotally mounted on a suitable stationary hanger, a resilient connection between the inking pad and the lower end of the bell crank, a horizontally slotted extension to the upper end of the bell crank, and a pin extending from the casing through the slot of the bell crank.

7. A dating or numbering mechanism comprising a rectangular supporting bar secured to a suitable base, a sleeve slidably mounted thereon, a standard extending upwardly from the sleeve having a horizontally extending bearing portion, a spring plunger held within such bearing portion, a collar slidably mounted upon the supporting bar at each end of the aforesaid sleeve, guideways formed integral with each collar, guide bars carried by the casing slidably fitting within the guideways, a tube having a closed upper end and an open lower end and a vertical slot extending from such open lower end secured to the casing, a hanger extending from the sleeve having a foot piece extending through the slot and fitting within the tube, and a compression spring extending between such foot piece and the top of such tube.

8. A dating or numbering mechanism comprising a rectangular supporting bar secured to a suitable base, a sleeve slidably mounted thereon, a standard extending upwardly from the sleeve having a horizontally extending bearing portion, a spring plunger held within such bearing portion, a collar slidably mounted upon the supporting bar at each end of the aforesaid sleeve, guideways formed integral with each collar, guide bars carried by the casing slidably fitting within the guideways, a tube having a closed upper end and an open lower end and a vertical slot extending from such open lower end secured to the casing, a hanger extending from the sleeve having a foot piece extending through the slot and fitting within the tube, a compression spring extending between such foot piece and the top of such tube, and means for locking the mechanism in position upon the supporting rod.

9. In a check writing machine, a series of carriers having cross grooves adapted to be brought into longitudinal alinement to form a continuous groove, slidable type pieces located in the cross grooves, resilient means for holding the type pieces in position, a member extending across the end of the alined cross groove and forming an abutment against which the movable type are forced, and means for forcing the type longitudinally against the spring means to abut one another and longitudinally of the grooves against the abutment.

10. In a check writing machine, a series of carriers having cross grooves adapted to be brought into longitudinal alinement to form a continuous groove, slidable type pieces located in the cross grooves, resilient means for holding the type pieces in position within the grooves, an end carrier carrying stationary type and forming an abutment against which the movable type are forced, and means for forcing the movable type longitudinally to abut one another and against the abutment.

11. In a check writing machine, a series of carriers having cross grooves adapted to be brought into longitudinal alinement to form a continuous groove, slidable type pieces located in the cross grooves, resilient means for holding the type pieces in position, a member extending across the end of the alined cross grooves and forming an abutment against which the movable type are forced, means for forcing the type pieces longitudinally against the spring means to abut one another and longitudinally of the grooves against the abutment, and releasable means for retaining the type in the abutting position against such resilient means.

12. In a device of the class described, a type carrier having cross grooves and edge recesses, type pieces located in the grooves, lugs extending from such type pieces through the recesses, and spring fingers secured at one end to the carrier and bearing at their opposite end against the lugs.

13. In a device of the class described, a type carrier having an arc-shaped peripheral portion having cross grooves and edge recesses, type pieces located in the grooves, lugs extending from such pieces through the recesses, and radial spring fingers secured at one end to the carrier and bearing at their opposite end against the lugs.

GEORGE ARTHUR ERRINGTON.

Witnesses:
 B. BOYD,
 M. EGAN.